(12) United States Patent
Gibson et al.

(10) Patent No.: US 11,746,802 B2
(45) Date of Patent: *Sep. 5, 2023

(54) OVER-PRESSURE PROTECTION SYSTEM

(71) Applicant: Mueller International, LLC, Atlanta, GA (US)

(72) Inventors: Daryl Lee Gibson, Challanooga, TN (US); Timofey Sitnikov, McDonald, TN (US); Bruce Robertson, Toronto (CA)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,328

(22) Filed: Aug. 4, 2022

(65) Prior Publication Data

US 2022/0373002 A1 Nov. 24, 2022

Related U.S. Application Data

(63) Continuation of application No. 16/941,175, filed on Jul. 28, 2020, now Pat. No. 11,441,584, which is a
(Continued)

(51) Int. Cl.
*G01L 19/06* (2006.01)
*F15B 20/00* (2006.01)
(Continued)

(52) U.S. Cl.
CPC .......... *F15B 20/007* (2013.01); *F15B 21/048* (2013.01); *G01L 19/06* (2013.01);
(Continued)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618;
(Continued)

(56) References Cited

U.S. PATENT DOCUMENTS 5,157,973 A 10/1992 Ciminelli
5,220,838 A 6/1993 Fung et al.
(Continued)

OTHER PUBLICATIONS

Gibson, Daryl Lee; Notice of Allowance for U.S. Appl. No. 16/169,225, filed Oct. 24, 2018, dated Jun. 10, 2020, 9 pgs.
(Continued)

*Primary Examiner* — Andre J Allen
(74) *Attorney, Agent, or Firm* — Taylor English Duma LLP

(57) ABSTRACT

An over-pressure protection system includes a main body housing defining a main body chamber configured to receive a fluid therein, wherein the main body housing comprises a spring, the main body housing configurable in a collapsed configuration and an expanded configuration; and a pressure sensor configured to measure a fluid pressure of the fluid, the pressure sensor configurable in an activated mode and a deactivated mode; wherein, in the collapsed configuration, the spring biases main body housing inward at an intermediate point of the main body housing such that the main body housing defines a substantially hourglass shape.

17 Claims, 7 Drawing Sheets

Related U.S. Application Data continuation of application No. 16/169,225, filed on Oct. 24, 2018, now Pat. No. 10,767,673.

(51) Int. Cl.
*F15B 21/048* (2019.01)
*F15B 11/042* (2006.01)

(52) U.S. Cl.
CPC ....... *G01L 19/0609* (2013.01); *F15B 11/0423* (2013.01); *F15B 2211/251* (2013.01); *F15B 2211/252* (2013.01); *F15B 2211/253* (2013.01)

(58) Field of Classification Search
CPC . G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................... 73/700–756
See application file for complete search history.

(56) References Cited

U.S. PATENT DOCUMENTS

| | | |
|---|---|---|
| 10,656,039 B2 | 5/2020 | Hershey et al. |
| 10,767,673 B2 | 9/2020 | Gibson et al. |
| 11,441,584 B2 | 9/2022 | Gibson et al. |
| 2007/0137304 A1 | 6/2007 | Rutherford et al. |
| 2012/0241018 A1 | 9/2012 | Alfano |
| 2016/0146687 A1 | 5/2016 | Longu |
| 2017/0089793 A1 | 3/2017 | Fetisov et al. |
| 2018/0087988 A1 | 3/2018 | Romo et al. |
| 2018/0259414 A1 | 9/2018 | Hershey et al. |
| 2020/0056954 A1 | 2/2020 | Wang et al. |
| 2020/0132093 A1 | 4/2020 | Gibson et al. |
| 2020/0355204 A1 | 11/2020 | Gibson et al. |

OTHER PUBLICATIONS

Gibson, Daryl Lee; Non-Final Office Action for U.S. Appl. No. 16/941,175, filed Jul. 28, 2020, dated Jan. 18, 2022, 14 pgs.
Gibson, Daryl Lee; Notice of Allowance for U.S. Appl. No. 16/941,175, filed Jul. 28, 2020, dated May 16, 2022, 8 pgs.

OVER-PRESSURE PROTECTION SYSTEM

CROSS-REFERENCE TO RELATED APPLICATIONS

The present application is a continuation of U.S. application Ser. No. 16/941,175, filed Jul. 28, 2020, which is a continuation of U.S. application Ser. No. 16/169,225, filed Oct. 24, 2018, which issued into U.S. Pat. No. 10,767,763 on Sep. 8, 2020, each of which is hereby incorporated by reference herein in its entirety.

TECHNICAL FIELD

This disclosure relates to the field of pressure monitors. More specifically, this disclosure relates to an over-pressure protection system for protecting a pressure monitor from damaging spikes in pressure.

BACKGROUND

Pressure sensors are commonly used to measure pressure in pipeline systems, including fire hydrant systems. Typically, pressure sensors have a maximum operating pressure. However, the pressure in a pipeline system can sometimes exceed the maximum operating pressure of sensor, when conditions such as water hammer occur. Pressures above the maximum operating pressure can cause damage to the sensor, which can require repair or replacement of the sensor.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is an over-pressure protection system comprising a main body comprising a main body housing, the main body housing defining a main body chamber; an incompressible fluid received in the main body chamber, the fluid defining a fluid pressure; a pressure sensor for measuring the fluid pressure of the incompressible fluid, the pressure sensor configurable an activated mode and a deactivated mode; a first barrier movable between a first position and a second position; wherein the over-pressure protection system is configurable an under-pressure configuration, wherein the pressure of the incompressible fluid is below a threshold pressure, and an over-pressure configuration, wherein the pressure of the incompressible fluid is equal to or above the threshold pressure; and a control system configuring the pressure sensor in the deactivated mode in the over-pressure configuration.

Also disclosed is an over-pressure protection system comprising a main body comprising a main body housing, the main body housing defining a main body chamber; an incompressible fluid received in the main body chamber, the incompressible fluid defining a fluid pressure; a pressure sensor for measuring the fluid pressure of the incompressible fluid; a first barrier comprising a barrier housing and a seal, the barrier housing defining a barrier chamber, the seal received in the barrier chamber, the seal movable between a first seal position, wherein the barrier chamber is sealed, and a second seal position, wherein the barrier chamber is unsealed; and a second barrier positioned in the main body chamber, the second barrier comprising a sealing surface, the sealing surface movable between a first sealing surface position and a second sealing surface position.

Also disclosed is a method for using an over-pressure protection system, the method comprising coupling the over-pressure protection system to a pipeline, the pipeline defining a pipeline pressure, the over-pressure protection system comprising a main body housing, the main body housing defining a main body chamber, an incompressible fluid received in the main body chamber; transmitting the pipeline pressure to the incompressible fluid; measuring a fluid pressure of the incompressible fluid with a pressure sensor of the over-pressure protection system; reconfiguring the over-pressure protection system from an under-pressure configuration to an over-pressure configuration at a threshold pressure of the incompressible fluid; and deactivating the pressure sensor in the over-pressure configuration.

An over-pressure protection system is disclosed, the over-pressure protection system comprising a main body housing defining a main body chamber; a fluid received in the main body chamber, the fluid defining a fluid pressure; a pressure sensor configured to measure the fluid pressure of the fluid, the pressure sensor configurable in an activated mode and a deactivated mode; and a control system configured to place the pressure sensor in the deactivated mode when the fluid pressure is equal to or above a pre-determined threshold pressure.

Additionally, an over-pressure protection system is disclosed wherein the over-pressure protection system comprises a main body housing defining a main body chamber; a fluid received in the main body chamber, the fluid defining a fluid pressure; a pressure sensor configured to measure the fluid pressure of the fluid; and a barrier positioned in the main body chamber and configured to move within the main body chamber between a first position and a second position.

A method for operating an over-pressure protection system is disclosed, the method comprising coupling the over-pressure protection system to a pipeline, the pipeline defining a pipeline pressure, the over-pressure protection system comprising a pressure sensor; measuring the pipeline pressure with the pressure sensor; and deactivating the pressure sensor when the pipeline pressure is equal to or above a threshold pressure.

Also disclosed is an over-pressure protection system includes a main body housing defining a main body chamber configured to receive a fluid therein, wherein the main body housing comprises a spring, the main body housing configurable in a collapsed configuration and an expanded configuration; and a pressure sensor configured to measure a fluid pressure of the fluid, the pressure sensor configurable in an activated mode and a deactivated mode; wherein, in the collapsed configuration, the spring biases main body housing inward at an intermediate point of the main body housing such that the main body housing defines a substantially hourglass shape.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
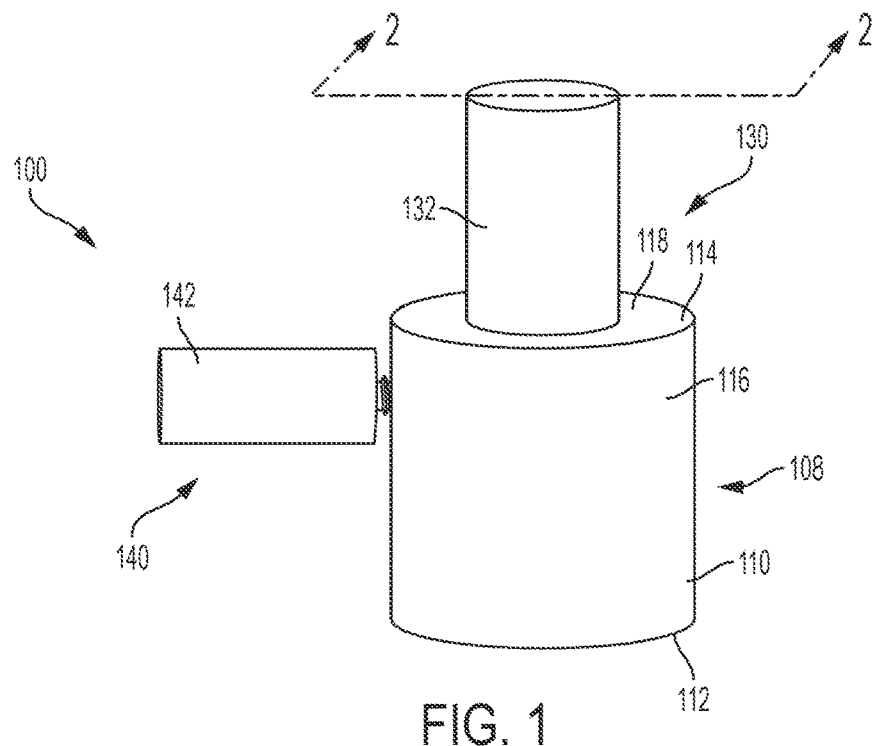
FIG. 1 is a perspective view of an over-pressure protection system in an under-pressure configuration, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is an over-pressure protection system and associated methods, systems, devices, and various apparatus. Example aspects of the over-pressure protection system can be configured in an under-pressure configuration and an over-pressure configuration. It would be understood by one of skill in the art that the disclosed over-pressure protection system is described in but a few exemplary aspects among many. No particular terminology or description should be considered limiting on the disclosure or the scope of any claims issuing therefrom.

FIG. 1 illustrates a first aspect of an over-pressure protection system 100. Example aspects of the over-pressure protection system 100 can be used in varying applications, including, for example, fire hydrant systems. As shown, the over-pressure protection system 100 can comprise a main body 108. The main body 108 can comprise a main body housing 110. According to example aspects, the main body housing 110 can define a first end 112 and an opposite second end 114. A cylindrical sidewall 116 can extend between the first end 112 and the second end 114, as shown. The main body housing 110 can further comprise an end wall 118 at the second end 114 of the main body housing 110. Example aspects of the main body housing 110 can be formed from a metal material, such as, for example, stainless steel. Other aspects of the main body housing 110 can be formed from any other suitable material, including, but not limited to, other metals and plastic.

According to example aspects, a pressure monitor 130 can be coupled to the end wall 118 of the main body housing 110, as shown. The pressure monitor 130 can comprise a monitor housing 132, as shown. In other aspects, the pressure monitor 130 can be coupled to the main body housing 110 at any other suitable location, such as the sidewall. The pressure monitor 130 housing can be formed from a number of suitable materials, including, but not limited to, metals and plastics. The over-pressure protection system 100 can further comprise an upper barrier 140 coupled to the sidewall of the main body housing 110. In other aspects, the upper barrier 140 can be coupled to the main body housing 110 at any other suitable location, such as the end wall 118. As shown, the upper barrier 140 can comprise an upper barrier housing 142, as shown. Example aspects of the upper barrier housing 142 can be formed from a number of suitable materials, including, but not limited to, metals and plastics.

Figure 2:
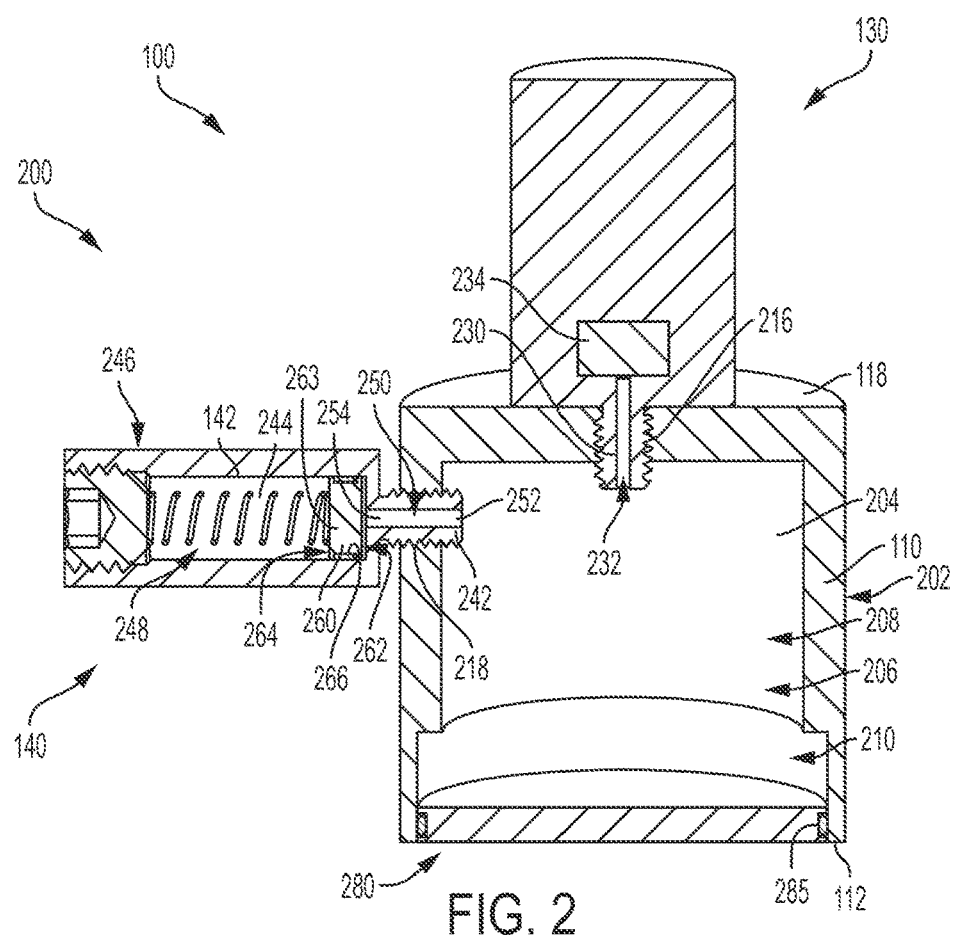
FIG. 2 is a cross-sectional view of the over-pressure protection system of FIG. 1, taken along line 2-2 in FIG. 1.
Figure 5:
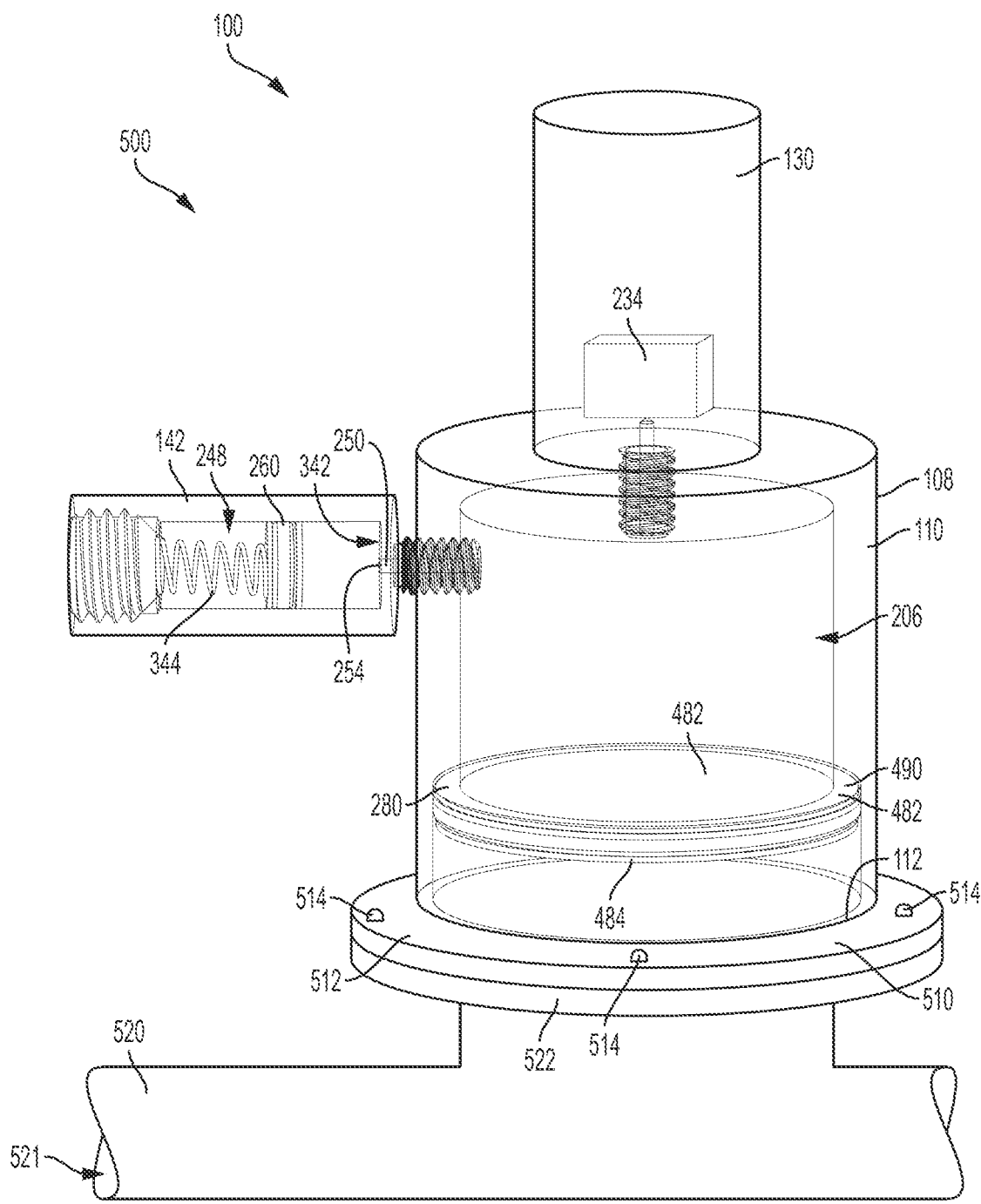
FIG. 5 is a perspective interior view of the over-pressure protection system of FIG. 1 in an over-pressure configuration.

FIG. 2 illustrates a cross-sectional view of the over-pressure protection system 100 of FIG. 1 in an under-pressure configuration 200, according to the present disclosure. Example aspects of the of the over-pressure protection assembling can be configured in the under-pressure configuration 200, as shown in FIG. 2, and an over-pressure configuration 500, as shown in FIG. 5. Referring to FIG. 2, the main body housing 110 can define an outer surface 202 and an inner surface 204. The inner surface 204 can define a main body chamber 206. In example aspects, the main body chamber 206 can define an upper body chamber 208 and a lower body chamber 210 in fluid communication with the upper body chamber 208. Each of the upper body chamber 208 and the lower body chamber 210 can define a substantially cylindrical shape. Furthermore, as shown, the lower body chamber 210 can define a diameter greater than a diameter of the upper body chamber 208, as shown. In example aspects, the first end 112 of the main body housing 110 can define an opening (not shown) providing access to the main body chamber 206. As shown, the over-pressure protection system 100 can comprise a lower barrier 280 for sealing the opening and enclosing the main body chamber 206.

According to example aspects, a calibrated, incompressible fluid can be received within the main body chamber 206. The incompressible fluid can maintain a constant density and volume as the pressure of the incompressible fluid changes. In one aspect, the incompressible fluid can be mineral oil. In other aspects, the incompressible fluid can be food-rated oil, or another suitable incompressible fluid. Furthermore, example aspects of the incompressible fluid can be mixed with air or another gas. As shown, the incompressible fluid can be encompassed and retained within the main body chamber 206 by the inner surface 204 of the main body housing 110 and the lower barrier 280.

The main body housing 110 can further comprise a first threaded bore 216 extending from the outer surface 202 to the inner surface 204. In example aspects, the first threated bore can extend through the end wall 118 and into the upper body chamber 208. The pressure monitor 130 can comprise a first threaded shaft 230 complementary to the first threaded bore 216 for coupling the pressure monitor 130 to the main body housing 110, as shown. Furthermore, as shown, example aspects first threaded shaft 230 can define a recess 232 within which the incompressible fluid can be received.

According to example aspects, the pressure monitor 130 can comprise a pressure sensor 234 for measuring the pressure of the incompressible fluid received in the recess 232. In example aspects, the pressure sensor 234 can define a maximum operating pressure, which can be a maximum pressure at which the pressure sensor 234 can safely and properly operate. Furthermore, the pressure sensor 234 can define an optimum performance ratio of gas to fluid. As described above, the incompressible fluid can be mixed with air (or another suitable gas). The ratio of air to fluid of the incompressible fluid can be close or equal to an optimum performance ratio of the pressure sensor 234. The optimum performance ratio of the pressure sensor 234 and the ratio of air to fluid of the incompressible fluid can vary and can be dependent upon the type of pressure sensor 234 used and the pressure data collection goals, among other factors.

The pressure monitor 130 can be further be configured to convert the pressure data measured by the pressure sensor 234 to an electrical signal and can transmit the signal to a third party. The party can be, for example, a pressure-monitoring software, a technician, etc. The pressure monitor 130 can also be configured to alert the third party when the measured pressure of the calibrated fluid falls outside of a desired range; for example, if the pressure of the calibrated fluid nears, meets, or exceeds the maximum operating pressure of the pressure sensor 234.

According to example aspects, the over-pressure protection system 100 can be configured in the under-pressure configuration 200, as shown, when the pressure of the incompressible fluid is below a pre-determined threshold pressure. In some aspects, the pre-determined threshold pressure can be about equal to the maximum operating pressure of the pressure sensor 234. In other aspects, the pre-determined threshold pressure can be less than the maximum operating pressure. For example, in one aspect, the pre-determined threshold pressure can be about 10 psi below the maximum operating pressure of the pressure sensor 234. In other aspects, the pre-determined threshold pressure can be greater or less than 10 psi below the maximum operating pressure.

The main body housing 110 can further comprise a second threaded bore 218 extending from the outer surface 202 to the inner surface 204. Examples aspects of the second threaded bore 218 can extend through the sidewall and into the upper body chamber 208. As shown, the upper barrier 140 can comprise a second threaded shaft 242 complementary to the second threaded bore 218 for coupling the upper barrier 140 to the main body housing 110. Furthermore, the upper barrier housing 142 can define an inner surface 244 and an outer surface 246. The inner surface 244 can define an upper barrier chamber 248.

Example aspects of the second threaded shaft 242 can define a tubular barrier channel 250 extending between the upper body chamber 208 and the upper barrier chamber 248. The tubular barrier channel 250 can define an inlet end 252 at the upper body chamber 208 and an outlet end 254 at the upper barrier chamber 248. The fluid from the main body chamber 206 can flow through the inlet end of the barrier channel 250 and can be received within the barrier channel 250. As shown, the upper barrier 140 can comprise a seal 260 for sealing and unsealing the upper barrier chamber 248 at the outlet end 254 of the barrier channel 250 to prohibit or allow, respectively, fluid flow into the upper barrier chamber 248 from the barrier channel 250. Example aspects of the seal 260 can comprise a sealing surface 262 and an opposite spring surface 264. In some aspects, a core 263 can extend between the sealing surface 262 and the spring surface 264, as will be described in further detail below. Furthermore, in some aspects, a groove 266 can be defined between the sealing surface 262 and spring surface 264, as shown. In example aspects, the main body chamber 206, recess 232, and channel 250 can be completely filled with the incompressible fluid.

Figure 3:
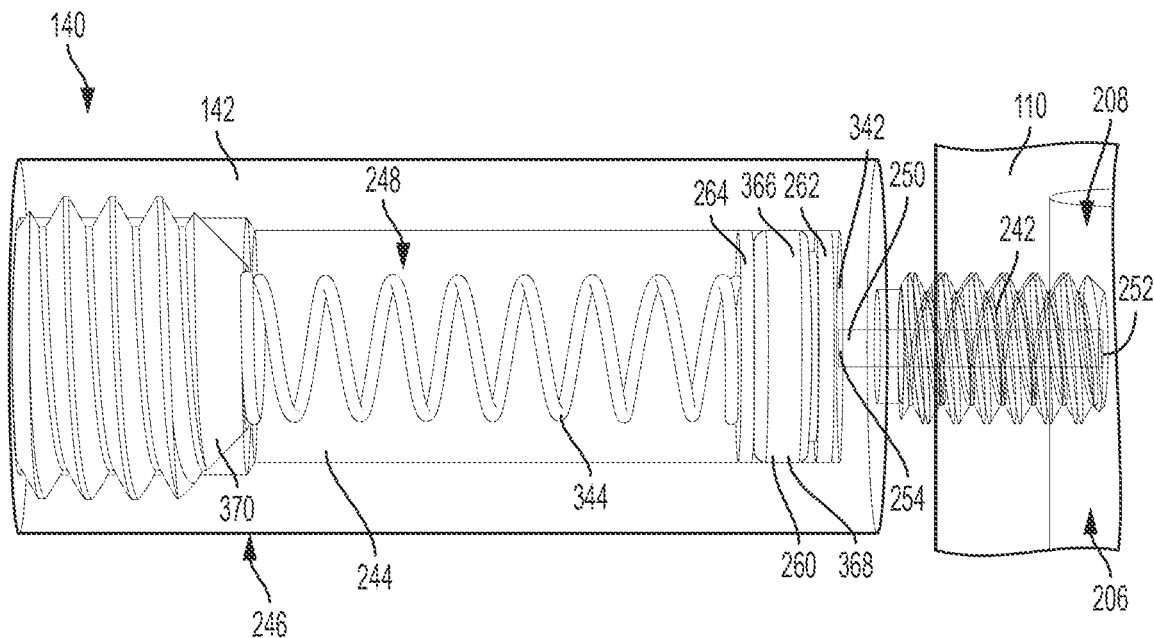
FIG. 3 is a side interior view of an upper barrier of the over-pressure protection system of FIG. 1.

FIG. 3 illustrates an example aspect of the upper barrier 140, according to the present disclosure. The upper barrier housing 142 is illustrated as transparent for visibility into the upper barrier chamber 248. As shown, the upper barrier chamber 248 can comprise a first end 342 positioned at the outlet end 254 of the barrier channel 250. The seal 260 can be biased towards the first end 342 of the upper barrier chamber 248 to seal 260 the outlet end 254 of the barrier channel 250 to prevent the incompressible fluid received in the main body chamber 206 from entering the upper barrier chamber 248. In example aspects, the seal 260 can be biased by a spring 344, such as a compression spring. In other aspects, the seal 260 can be biased by any other suitable biasing means known in the art.

Example aspects of the seal 260 can comprise the sealing surface 262, the spring surface 264, and the core 263 extending therebetween. The sealing surface 262 can be configured to engage the first end 342 of the upper barrier chamber 248. Example aspects of the sealing surface 262 can comprise an elastomer, such as, for example, a rubber material. In other aspects, the seal 260 can be formed from silicone, cork, neoprene, or any other suitable sealing material for forming a liquid-tight seal between the sealing surface 262 and the first end 342. Furthermore, as shown, the spring surface 264 can be configured to engage the spring 344. Example aspects of the spring surface 264 can be formed from a metal material, such as stainless steel. In other aspects, the spring surface 264 can be formed from another metal material, plastic, or any other suitable material known in the art.

Example aspects of the seal 260 can further comprise a movement mechanism 366. The movement mechanism 366 of the seal 260 can be configured to facilitate movement of the seal 260 within upper barrier chamber 248. In example aspects, as shown, the movement mechanism 366 can be an O-ring 368 configured to engage and slide along the inner surface 244 of the upper barrier housing 142, such that the seal 260 can slide laterally within the upper barrier chamber 248. As shown, the O-ring 368 can encircle the core 263 (shown in FIG. 2) between the sealing surface 262 and the spring surface 264. In some aspects, the O-ring 368 can be received in the groove 266 (shown in FIG. 2) defined between sealing surface 262 and the spring surface 264, as shown, such that the O-ring 368 is about flush with the sealing surface 262 and spring surface 264. Furthermore, in some aspects, the sealing surface 262 and/or the movement mechanism 366 can form a liquid-tight seal with the inner surface 244 of the upper barrier housing 142, such that the calibrated fluid cannot flow through or around the seal 260 as the seal 260 moves within the upper barrier chamber 248. In other aspects, the movement mechanism 366 can be any other suitable mechanism for rolling, sliding, gliding or otherwise moving the seal 260 within the upper barrier chamber 248.

As shown, the spring 344 can extend between the spring surface 264 and a spring stop 370. The spring stop 370 can be rigidly fixed to the upper barrier housing 142. In example aspects, the spring 344 can define a spring force. The spring force can be about equal to the pre-determined threshold pressure. For example, in one aspect, the pre-determined threshold pressure can be about 300 psi and the spring force can be about 300 psi. In other aspects, the threshold pressure and the spring force can be greater or less than 300 psi. When the pressure of the incompressible fluid is less than 300 psi (i.e., less than the spring force), the spring 344 can bias the seal 260 against the first end 342 of the upper barrier chamber 248, preventing the incompressible fluid from entering the upper barrier chamber 248 through the barrier channel 250. However, when the pressure of the incompressible fluid is greater than 300 psi (i.e., greater than the spring force), the pressure of the fluid can overcome the spring force and compress the spring 344. As the spring 344 compresses, the seal 260 can be pulled away from the first end 342 of the barrier chamber 248, allowing the incompressible fluid to enter the barrier chamber 248 through the channel 250. According to example aspects, the pre-determined threshold pressure and the spring force can be designated as desired by a manufacturer. Moreover, the spring force can be less than or about equal to the maximum operating pressure of the pressure sensor 234, just as the pre-determined threshold pressure can be less than or about equal to the maximum operating pressure.

Figure 4:
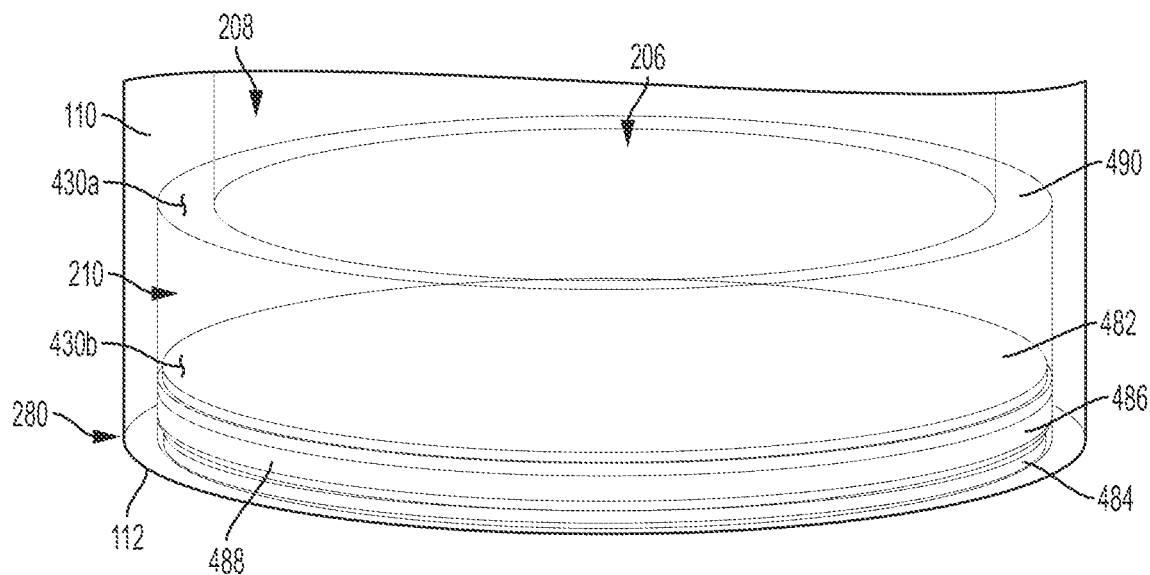
FIG. 4 is a perspective interior view of a lower barrier of the over-pressure protection system of FIG. 1.

FIG. 4 illustrates an example aspect of the lower barrier 280, according to the present disclosure. The lower barrier 280 can be oriented at the open end of the lower body chamber 210, proximate the first end 112 of the main body housing 110. As shown, the lower barrier 280 can comprise a sealing surface 482, a bottom surface 484, and a movement mechanism 486 therebetween. According to example aspects, the sealing surface 482 can be formed from an elastomer, such as rubber. Other example aspects of the sealing surface 482 can be formed from silicone, cork, neoprene, or any other suitable sealing material. Similar to the movement mechanism 366 of the seal 260, the movement mechanism 486 can be an O-ring 488 configured to engage and slide along the inner surface 204 at the main body chamber 206. Example aspects of the O-ring 488 can be received within a groove 285 (shown in FIG. 2) formed between the sealing surface 482 and bottom surface 484. In other aspects, the movement mechanism 486 can be any other suitable mechanism for rolling, sliding, gliding or otherwise moving the lower barrier 280 within the main body chamber 206. According to example aspects, a diameter of the lower barrier 280 can be about equal to the diameter of the lower body chamber 210, such that the lower barrier 280 can form a liquid-tight seal with inner surface 204 of the main body housing 110 at the lower body chamber 210. Such a liquid-tight seal can prevent the incompressible fluid from escaping the over-pressure protection system 100.

In example aspects, the inner surface 204 of the main body housing 110 can define a radially-extending stop surface 490 between the upper body chamber 208 and lower body chamber 210. As illustrated, the stop surface 490 can be oriented substantially parallel to the sealing surface 482 of the lower barrier 280. The stop surface 490 can be configured to engage the sealing surface 482 of the lower barrier 280 to prohibit the lower barrier 280 from entering the upper body chamber 208 and to confine the movement of the lower barrier 280 to within the lower body chamber 210. Furthermore, according to example aspects, the sealing surface 482 can be configured to form a liquid-tight seal with the stop surface 490 when engaged with the stop surface 490.

According to example aspects, a first wire 430a can be positioned at or near the stop surface 490 and a second wire 430b can be positioned on the lower barrier 280; for example, on the sealing surface 482. When the sealing surface 482 of the lower barrier 280 engages the stop surface 490, the first wire 430a can contact the second wire 430b. In example aspects, the contact of the first wire 430a with the second wire 430b can send an electrical signal to the pressure sensor 234 (shown in FIG. 2) to deactivate the pressure sensor 234 (e.g., to shut down or discontinue pressure measurements). In some aspects, the electrical contact between the first and second wires 430a,b can also trigger the pressure monitor 130 to send an alert signal to the third party, as will be described in further detail below.

Figure 6:
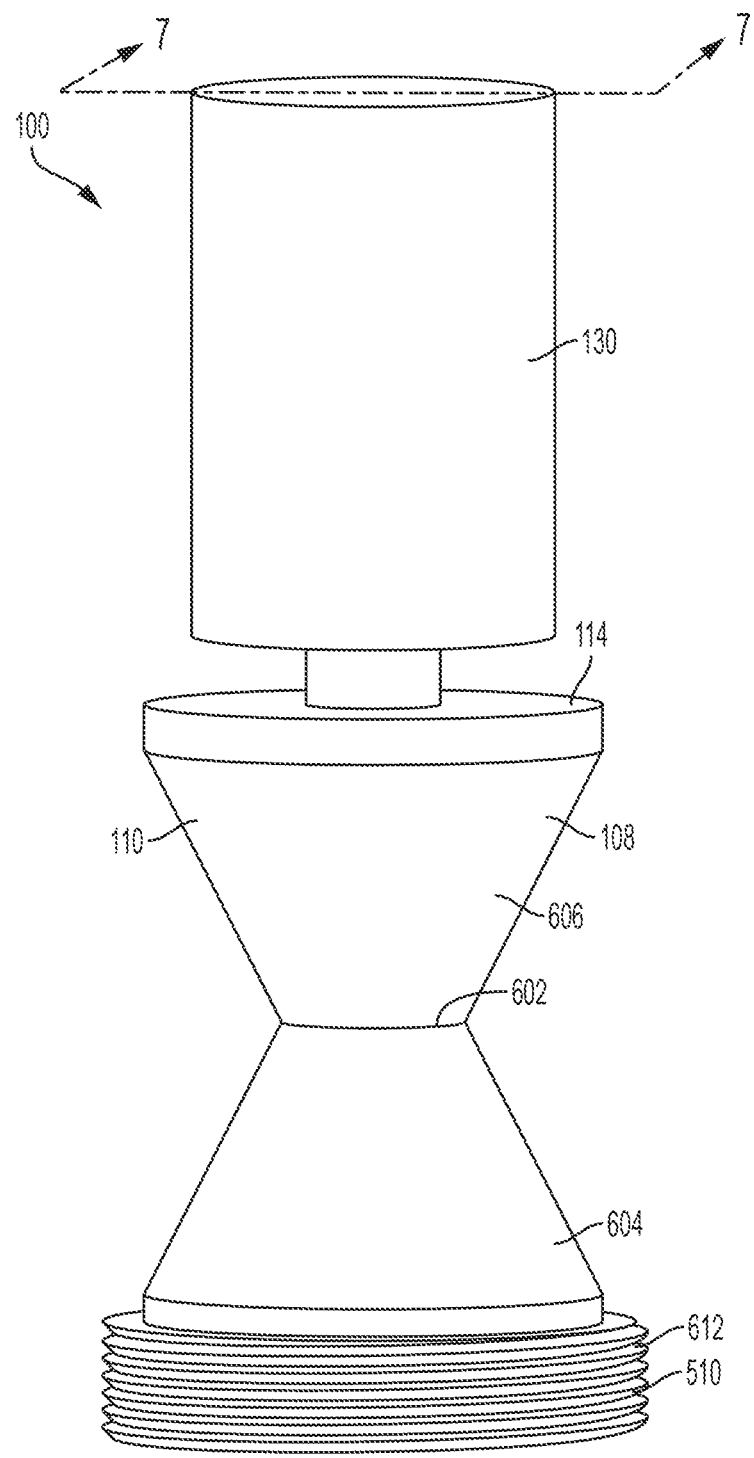
FIG. 6 is a perspective view of another aspect of an over-pressure protection system in the under-pressure configuration, in accordance with the present disclosure.

FIG. 5 illustrates the over-pressure protection system 100 in the over-pressure configuration 500. The main body housing 110, upper barrier housing 142, and pressure monitor 130 housing are illustrated as transparent for visibility into the interior of these components. As shown, example aspects of the main body housing 110 can comprise a coupling mechanism 510 for coupling the over-pressure protection system 100 to a pipeline 520. The coupling mechanism 510 can be oriented at or adjacent to the first end 112 of the main body housing 110. In some aspects, as shown, the coupling mechanism 510 can be an annular mounting flange 512. The mounting flange 512 can be coupled to a complementary mounting flange 522 of the pipeline 520 by one or more fasteners 514, as illustrated. In the current aspects, the fasteners 514 can be nuts and bolts. In other aspects, the coupling mechanism 510 can be any other suitable coupling mechanism known in the art. For example, the coupling mechanism 510 can be a threaded fastener 612, as illustrated in FIG. 6, which will be described in further detail below.

Example aspects of the pipeline 520 can comprise a fluid (e.g., water, oil, gas) flowing through an interior 521 of the pipeline 520. As shown, the bottom surface 484 of the lower barrier 280 can be in contact with the fluid in the pipeline 520 and the sealing surface 482 of the lower barrier 280 can be in contact with the incompressible fluid. The liquid-tight seal of the lower barrier 280 with the inner surface 204 of the main housing body can prevent fluid in the pipeline 520 from entering the main body chamber 206 and can also prevent the incompressible fluid in the over-pressure protection system 100 from entering the pipeline 520. According to example aspects, the over-pressure protection system 100 can serve to measure a pressure in the pipeline 520 at the location of the over-pressure protection system 100, a method for which is described below.

A first method for using the over-pressure protection system 100 is provided. In example aspects, the method can comprise coupling the over-pressure protection system 100 to the pipeline 520. The pressure in the pipeline 520 can be transmitted to the incompressible fluid within the over-pressure protection system 100, as the pressure in the pipeline 520 is applied to the incompressible fluid through the lower barrier 280. Thus, the pressure of the incompressible fluid can be substantially the same as the pressure in the pipeline 520. As such, the method can further comprise measuring the pressure of the incompressible fluid with the pressure sensor 234 to determine the pressure in the pipeline 520. The method can further comprise converting the pressure data into an electrical signal and transmitting the signal to the third party.

Example aspects of the over-pressure protection system 100 can also serve to protect the pressure monitor 130, and particularly the pressure sensor 234, from damage that can be caused by pressures exceeding the maximum operating pressure of the pressure sensor 234. As described above, the pressure in the pipeline 520 can be transmitted to the incompressible fluid. When the pressure in the pipeline 520, and thus the pressure of the incompressible fluid, exceeds the spring force of the spring 344 (i.e., exceeds the pre-determined threshold pressure), the spring 344 can be compressed and the seal 260 can be pulled away from the outlet end 254 of the channel 250. As described above, the incompressible fluid can enter the upper barrier chamber 248 through the channel 250 when the outlet end 254 is unsealed.

As the incompressible fluid enters the upper barrier chamber 248, the lower barrier 280 can be drawn towards the stop surface 490 of main body 108. According to example aspects, when the sealing surface 482 of the lower barrier 280 engages the stop surface 490, the first wire 430a (shown in FIG. 4) can contact the second wire 430b (shown in FIG. 4). The electrical contact between the first and second wires 430a,b can send an electrical signal to the pressure sensor 234 to deactivate the pressure sensor 234 (e.g., a signal to shut down or a signal to discontinue pressure measurements), which can aid in preventing damage to the pressure sensor 234. The electrical contact between the first and second wires 430a,b can also trigger the pressure monitor 130 to send a signal to alert the third party of the excessive-pressure condition. For example, the alert signal can communicate that no pressure reading is available, that the pre-determined threshold pressure has been exceeded, or another suitable sentiment.

As such, a second method for using the over-pressure protection system 100 can comprise providing a main body chamber 206 and an incompressible fluid received in the main body chamber 206. A pressure sensor 234 can also be provided and the method can comprise measuring the pressure of the incompressible fluid. Example aspects of the over-pressure protection system 100 can define the maximum threshold pressure of the incompressible fluid, and the method can comprise unsealing an upper barrier chamber 248 at the pre-determined threshold pressure to allow a portion of the incompressible fluid to enter the upper barrier chamber 248. In some aspects, unsealing the upper barrier chamber 248 can comprise compressing the spring 344 to draw the seal 260 away from the first end 342 of the upper barrier chamber 248, wherein the spring 344 defines a spring force about equal to the pre-determined threshold pressure. The over-pressure protection system 100 can also comprise a lower barrier 280, and the method can comprise pulling the lower barrier 280 towards a stop surface 490. Example aspects of the method can additionally comprise engaging the stop surface 490 with the lower barrier 280. In some aspects, the method can further comprise contacting the first wire 430a of the lower barrier 280 with the second wire 430b of the stop surface and sending an electrical signal to deactivate the pressure sensor 234.

FIGS. 6-9 illustrate a second example aspect of the over-pressure protection system 100, according to the present disclosure. As shown in FIG. 6, the over-pressure protection system 100 can comprise the main body 108. The main body 108 can comprise the main body housing 110, and the main body housing 110 can define the first end 112 (shown in FIG. 7) and the opposite second end 114. In example aspects, such as the depicted aspect, the first end 112 can taper towards an intermediate point 602 of the main body housing 110, and the second end 114 can taper towards the intermediate point 602 of the main body housing 110. As such, as shown, the main body housing 110 can define a diameter at the first end 112 that is greater than a diameter at the intermediate point 602, and a diameter at the second end 114 that is greater than the diameter at the intermediate point 602. The intermediate point 602 of the main body housing 110 can be defined as a point in between the first end 112 and second end 114.

The portion of the main body housing 110 defined between the first end 112 and the intermediate point 602 can be considered a lower portion 604 of the main body housing 110, and the portion defined between the second end 114 and the intermediate point 602 can be considered an upper portion 606 of the main body housing 110. As shown, the lower portion 604 of the main body housing 110 can generally define a truncated cone shape, and the upper portion 606 can define an inverted truncated cone shape. As such, the main body housing 110 can overall define a generally hourglass shape. In example aspects, the main body housing 110 can be formed a metal material, such as stainless steel. In other aspects, the main body housing 110 can be formed from another material, such as, for example, aluminum, spring steel, plastic, or any other suitable material. Furthermore, in some aspects, the main body housing 110 can be formed from sheet metal material.

As shown, the pressure monitor 130 can be connected to the second end 114 of the main body housing 110. Furthermore, the coupling mechanism 510 can be formed at the first end 112 of the main body housing for coupling the over-pressure protection system 100 to the pipeline 520 (shown in FIG. 9). The coupling mechanism 510 can be, as shown, a threaded fastener 612; however, in other example aspects, the coupling mechanism 510 can be any other suitable coupling mechanism 510 known in the art. The threaded fastener 612 can be configured to engage a complementary threaded pipeline bore 902 (shown in FIG. 9) of the pipeline 520 (shown in FIG. 9).

Figure 7:
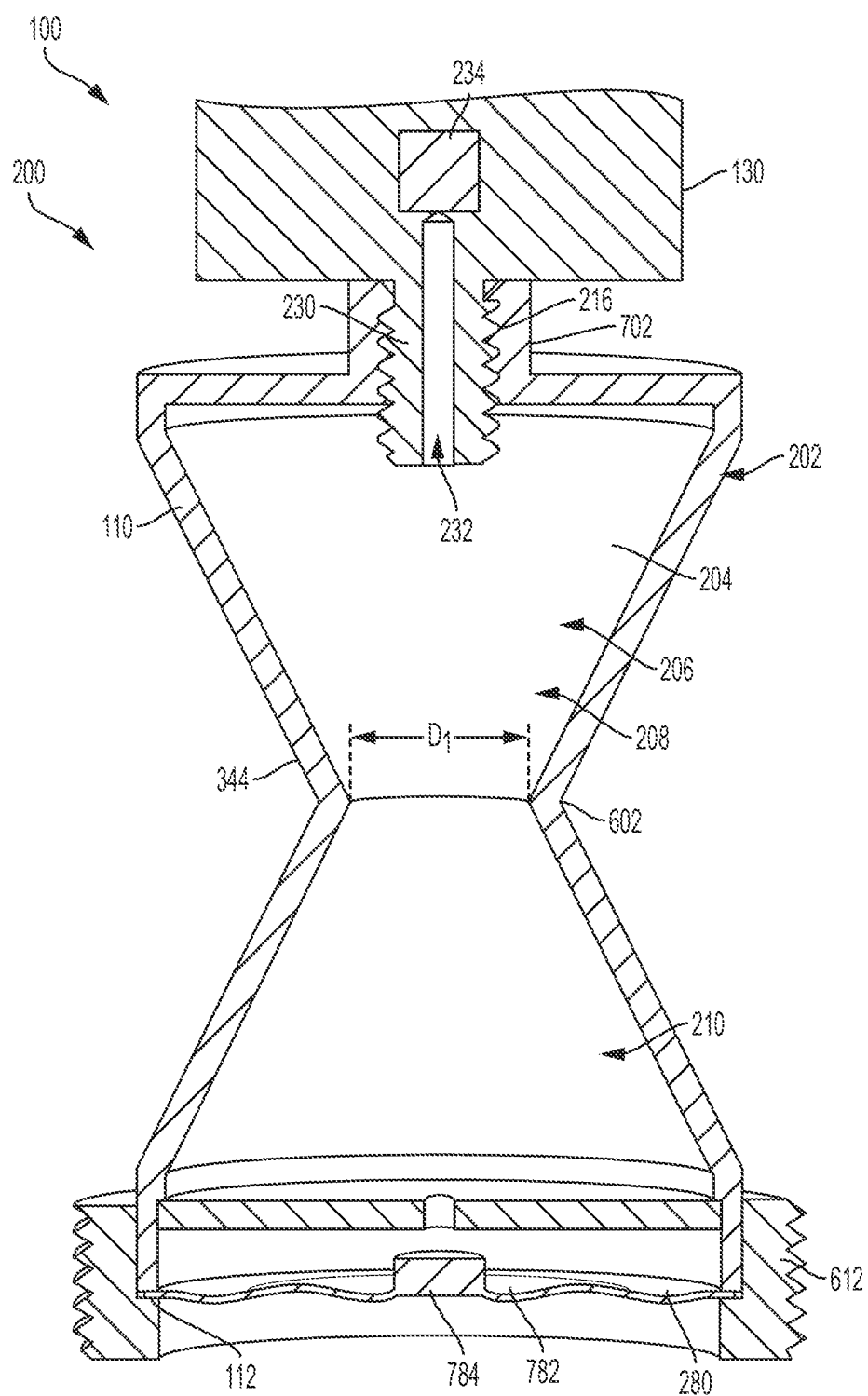
FIG. 7 is a cross-sectional view of the over-pressure protection system of FIG. 6 taken along line 7-7 in FIG. 6.

FIG. 7 illustrates a cross-sectional view of the over-pressure protection system 100 of FIG. 6 in the under-pressure configuration 200. As shown, the inner surface 204 of the main body housing 110 defines a substantially hourglass-shaped main body chamber 206, and the main body chamber 206 can define the upper body chamber 208 and the lower body chamber 210. The main body chamber 206 can be filled with the incompressible fluid. In the current aspect, a cylindrical sleeve 702 can extend from the end wall 118 of the main body housing 110 and can define the first threaded bore 216 for engaging the first threaded shaft 230 of the pressure monitor 130. Furthermore, the incompressible fluid can be received in the recess 232 of the pressure monitor 130, such that the pressure sensor 234 of the pressure monitor 130 can measure the pressure of the incompressible fluid received in the recess 232. In the depicted aspects, the main body chamber 206 and the recess 232 of the pressure monitor 130 can be completely filled with the incompressible fluid.

Example aspects of the main body housing 110 can serve as the spring 344 and can define the spring force. As shown in FIG. 7, the spring force can bias the main body housing 110 inward towards the intermediate point 602 to define an under-pressure diameter $D_1$ at the intermediate point 602 in the under-pressure configuration 200. As described above, the over-pressure protection system 100 can be oriented in the under-pressure configuration 200 when the pressure of the incompressible fluid received in the main body chamber 206 is less than the spring force.

The over-pressure protection system 100 can further comprise the lower barrier 280 coupled to the main body housing 110, as shown; in the present aspect, the upper barrier 140 is not present. The lower barrier 280 can comprise a flexible diaphragm 782, or membrane, which can seal the opening of the lower body chamber 210 to retain the incompressible fluid within the over-pressure protection system 100, and a seal 784, which will be described in further detail below. In example aspects, a peripheral edge of the flexible diaphragm 782 can be retained between the threaded fastener 612 and the first end 112 of the main body housing 110 to attach the flexible diaphragm 782 to the over-pressure protection system 100. Some example aspects can additionally or alternately comprise a fastener, such as an adhesive, for attaching the flexible diaphragm 782 to the over-pressure protection system 100. As shown, in example aspects, the flexible diaphragm 782 can define some slack in the under-pressure configuration 200.

Figure 8A:
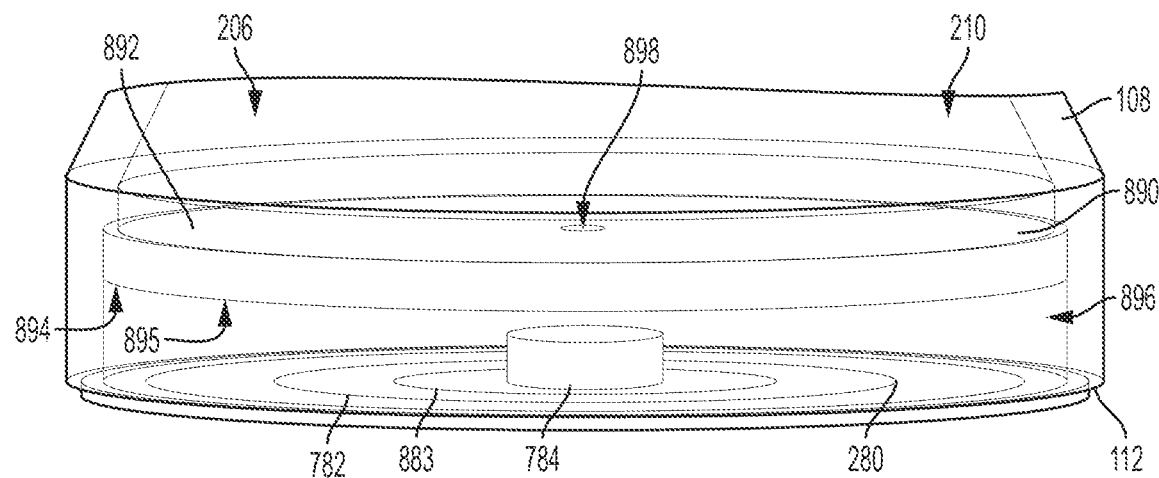
FIG. 8A is a perspective interior view of a lower barrier of the over-pressure protection system of FIG. 6.
Figure 8B:
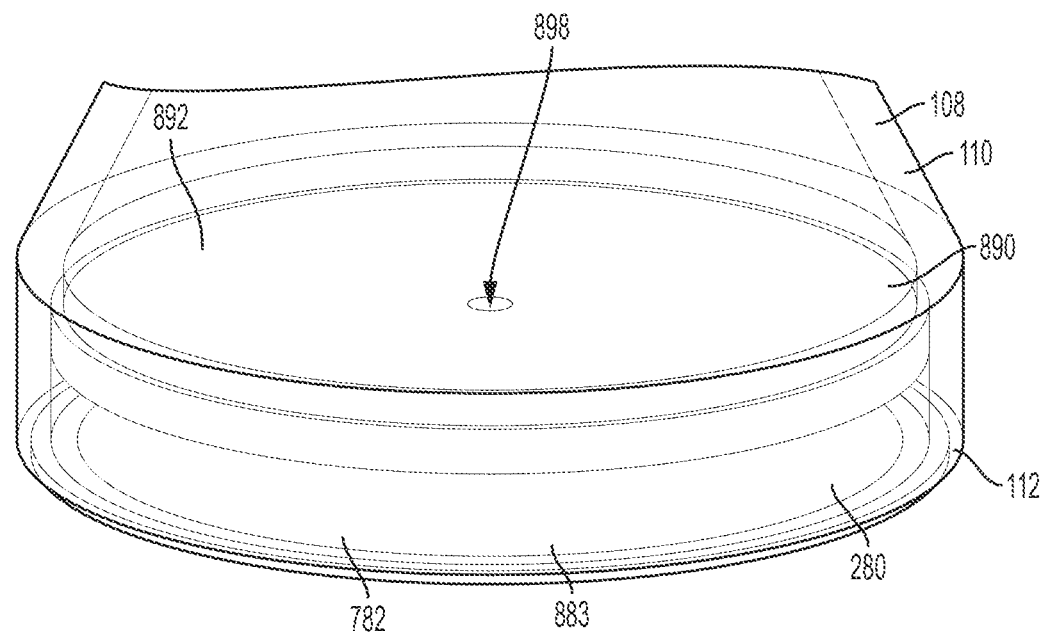
FIG. 8B is an alternate perspective interior view of the lower barrier of FIG. 8A.

FIGS. 8A and 8B each illustrate a close-up view of the lower barrier 280. The flexible diaphragm 782 can define a substantially circular shape and can extend across the opening proximate the first end 112 of the main body housing 110. Example aspects of the flexible diaphragm 782 can be formed from a pliable material, such as, for example, PTFE (polytetrafluoroethylene), or any other suitable material known in the art. Furthermore, as shown, the seal 784 can be positioned on the flexible diaphragm 782. In example aspects, such as the aspect depicted, the seal 784 can define a substantially solid, cylindrical structure and can be positioned on a top surface 883 of the flexible diaphragm 782. In some aspects, the seal 784 can be oriented at the center of the flexible diaphragm 782, as shown. The seal 784 can be formed from an elastomer, such as a rubber material in some aspects. In other aspects, the seal 784 can be formed from silicone, cork, neoprene, or any other suitable sealing material.

According to example aspects, the main body 108 can define a stop disc 890 extending radially inward from the inner surface 204 (shown in FIG. 7) of the main body chamber 206. As shown, the stop disc 890 can be positioned within the lower body chamber 210 between the lower barrier 280 and the upper body chamber 208 (shown in FIG. 7), such that a sub-chamber 896 of the lower body chamber 210 can be formed between the lower barrier 280 and the stop disc 890. Example aspects of the stop disc 890 can define a ring-shaped structure comprising an upper surface 892 and an opposite lower surface 894. The stop disc 890 further can define a hole 898 extending from the upper surface 892 to the lower surface 894. The hole 898 can be vertically aligned with the seal 784 of the lower barrier 280, relative to the orientation shown. According to example aspects, the incompressible fluid can flow through the hole 898 of the stop disc 890. Moreover, in example aspects, the lower surface 894 of the stop disc 890 can be a stop surface 895 for engaging the seal 784 in the over-pressure configuration 500, as shown and described in further detail below with reference to FIG. 9. Example aspects of the stop disc 890 can be formed from metal, plastic, or any other suitable material known in the art.

Figure 9:
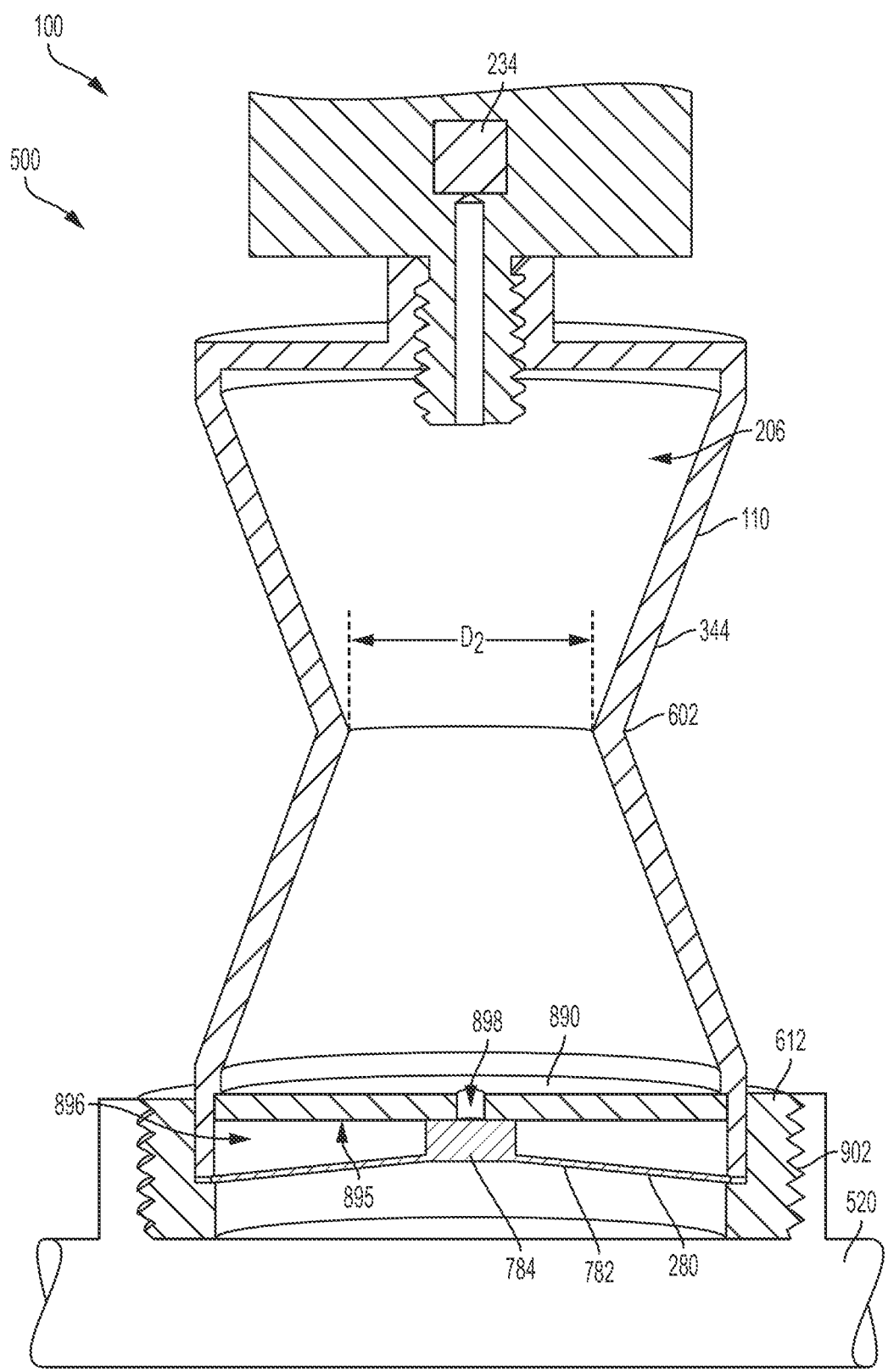
FIG. 9 is a cross-sectional view of the over-pressure protection system of FIG. 6 in an over-pressure configuration and taken along line 7-7 in FIG. 6.

Referring to FIG. 9, the over-pressure protection system 100 is illustrated in the over-pressure configuration 500. As shown, the threaded fastener 612 of the over-pressure protection system 100 can be coupled to the pipeline 520 by engaging the threaded fastener 612 with the threaded pipeline bore 902 of the pipeline 520. As described above, the pressure in the pipeline 520 can be transmitted to the incompressible fluid. When the pressure of the incompressible fluid exceeds the spring force of the spring 344, the spring force can be overcome. In the current aspect, when the pressure of the incompressible fluid exceeds the spring force, the main body housing 110 can be biased outward at the intermediate point 602, expanding the main body chamber 206 and increasing the volume thereof. When expanded, the main body chamber 206 can define an over-pressure diameter $D_2$ at the intermediate point 602 that is greater than the under-pressure diameter $D_1$ (shown in FIG. 7).

Furthermore, as the main body housing 110 expands, the incompressible fluid received in the sub-chamber 896 can be sucked through the hole 898 in the stop disc 890 and the seal 784 of the lower barrier 280 can be drawn towards the stop surface 895. The slack in the flexible diaphragm 782 can allow the flexible diaphragm 782 and seal 784 to move towards the stop surface 895 in the over-pressure configuration 500, tautening the flexible diaphragm 782. The seal 784 can engage the stop surface 895 and can seal the hole 898 of the stop disc 890, as shown. The over-pressure protection system 100 can further be configured to deactivate the pressure sensor 234 upon the seal 784 engaging the stop surface 895 in substantially the same manner as described above.

As such, another method for using the over-pressure protection system 100 is provided. The method can comprise providing a main body chamber 206 and an incompressible fluid received in the main body chamber 206, wherein the main body chamber 206 is defined by a main body housing 110, and wherein the main body housing 110 defines a spring force. A pressure sensor 234 can also be provided, and the method can comprise measuring the pressure of the incompressible fluid. The method further can comprise overcoming the spring force at the threshold pressure of the incompressible fluid and expanding the main body housing 110. Moreover, the method can comprise drawing the lower barrier 280 towards the stop surface 895 and engaging a seal 784 of the lower barrier 280 with the stop surface 895. In some aspects, the method can further comprise contacting the first wire 430a of the lower barrier 280 with the second wire 430b of the main body housing 110 and sending an electrical signal to deactivate the pressure sensor 234. Some aspects can further comprise alerting a third party that the threshold pressure of the incompressible fluid has been met and/or exceeded.

Furthermore, a general method for using the over-pressure protection system 100 can comprise coupling the over-pressure protection system 100 to a pipeline 520, wherein the pipeline 520 defines a pipeline pressure, and the over-pressure protection system comprises a main body housing 110, the main body housing 110 defining a main body chamber 206, and an incompressible fluid received in the main body chamber 206. The method can further comprise transmitting the pipeline pressure to the incompressible fluid and measuring a fluid pressure of the incompressible fluid with a pressure sensor 234 of the over-pressure protection system 100. Example aspects can further comprise reconfiguring the over-pressure protection system 100 from an under-pressure configuration 200 to an over-pressure configuration 500 at a threshold pressure of the incompressible fluid and deactivating the pressure sensor 234 in the over-pressure configuration 500.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An over-pressure protection system comprising:
    a main body housing defining a main body chamber configured to receive a fluid therein, wherein the main body housing comprises a spring, the main body housing configurable in a collapsed configuration and an expanded configuration; and
    a pressure sensor configured to measure a fluid pressure of the fluid, the pressure sensor configurable in an activated mode and a deactivated mode;
    wherein, in the collapsed configuration, the spring biases main body housing inward at an intermediate point of the main body housing such that the main body housing defines a hourglass shape.

2. The over-pressure protection system of claim 1, wherein the main body housing defines a first diameter at the intermediate point in the collapsed configuration and a second diameter at the intermediate point in the expanded configuration, the second diameter greater than the first diameter.

3. The over-pressure protection system of claim 2, wherein the main body housing defines a first volume in the collapsed configuration and a second volume in the expanded configuration, and wherein the second volume is greater than the first volume.

4. The over-pressure protection system of claim 1, further comprising a barrier configured to move between a first position and a second position within the main body chamber, wherein the barrier is in the first position in the collapsed configuration and the second position in the expanded configuration.

5. The over-pressure protection system of claim 4, wherein the barrier defines a seal and a stop disc extends across the main body chamber, and wherein the seal is disengaged from the stop disc in the first position and the seal engaged with the stop disc in the second position.

6. The over-pressure protection system of claim 5, wherein:
the stop disc defines a disc hole therethrough;
the disc hole is in fluid communication with the main body chamber;
the fluid can flow through the disc hole in the collapsed configuration; and
the seal covers the disc hole and the fluid is prohibited from flowing through the disc hole in the expanded configuration.

7. The over-pressure protection system of claim 6, wherein the barrier is a flexible diaphragm.

8. The over-pressure protection system of claim 7, wherein the seal extends from a top surface of the flexible diaphragm towards the stop disc.

9. The over-pressure protection system of claim 8, wherein the disc hole is formed through a center of the stop disc, and wherein the seal is attached to the flexible diaphragm at a center of the flexible diaphragm.

10. The over-pressure protection system of claim 5, wherein:
the main body housing defines a first end and a second end opposite the first end;
the intermediate point is disposed between the first end and the second end;
the barrier is disposed proximate the first end; and
the stop disc is disposed within the main body chamber between the barrier and the intermediate point.

11. The over-pressure protection system of claim 10, wherein, in the collapsed configuration, a diameter of the main body housing tapers inward from the stop disc to the intermediate point and from the second end to the intermediate point, and the diameter of the main body is consistent from the stop disc to the barrier.

12. The over-pressure protection system of claim 10, further comprising a pressure monitor, the pressure monitor comprising the pressure sensor and mounted to the main body housing at the second end thereof.

13. The over-pressure protection system of claim 12, wherein one of the main body housing and the pressure monitor comprises an internal threaded fastener, and the other of the main body housing defines an external threaded fastener configured to engage the internal threaded fastener to couple the pressure monitor to the main body housing.

14. The over-pressure protection system of claim 10, wherein the over-pressure protection system further comprises a pipeline fastener disposed at the first end of the main body housing, the pipeline fastener configured to engage a complementary threaded pipeline bore of a pipeline.

15. The over-pressure protection system of claim 14, wherein the pipeline fastener is a threaded pipeline fastener.

16. The over-pressure protection system of claim 1, wherein the over-pressure protection system further comprises the fluid received within the main body chamber, and wherein the fluid is an incompressible fluid.

17. The over-pressure protection system of claim 16, wherein the over-pressure protection system further comprises a control system configured to place the pressure sensor in the deactivated mode when the fluid pressure is equal to or above a pre-determined threshold pressure.

* * * * *